United States Patent Office 3,342,801
Patented Sept. 19, 1967

3,342,801
WATER INSOLUBLE PYRAZOLONE MONOAZO DYESTUFFS
Hugo Illy, Toms River, N.J., assignor to Toms River Chemical Corporation, Toms River, N.J., a corporation of Delaware
No Drawing. Filed May 18, 1964, Ser. No. 368,408
5 Claims. (Cl. 260—162)

ABSTRACT OF THE DISCLOSURE

Compounds of the formula

A—N=N—B in which A represents a benzoic acid phenylester radical bound to the azo linkage in ortho position to the carbonyl group, and B stands for an 1-arylsulfonyl-3-alkylpyrazolone-(5) radical bound to the azo linkage in 4-position and which are free from groups imparting solubility in water in particular sulfonic acid groups are azo dyestuffs providing yellow dyeings of good fastness properties and are particularly adapted for coloring hydrophobic fibers.

---

This invention provides valuable azo dyestuffs which are free from groups imparting solubility in water, especially sulfonic acid and carboxylic acid groups, and correspond to the formula

A—N=N—B in which A represents a benzoic acid phenylester radical bound to the azo linkage in ortho position to the carbonyl group, and B stands for an 1-arylsulfonyl-3 - alkylpyrazolone-(5) radical bound to the azo linkage in 4-position.

The invention also provides a process for the manufacture of monoazo dyestuffs which are free from groups imparting solubility in water wherein a diazotized 2-aminobenzoic acid phenyl ester is coupled with an 1-arylsulfonyl-3-methyl-pyrazolone-(5), the components used being free from groups imparting solubility in water, such as sulfonic acid and carboxylic acid groups.

As diazo components there may be used especially 2-aminobenzoic acid phenylesters of the formula

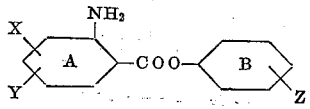

in which X stands for hydrogen, halogen and nitro, Y stands for hydrogen and halogen, and Z stands for hydrogen, halogen, lower alkyl, amino, acylamino, arylamino, hydroxyl, alkoxy and nitro. As examples of suitable diazo components there may be mentioned 2-aminobenzoic acid phenylester, 2-amino-5-chlorobenzoic acid phenylester, 2-aminobenzoic acid-4'-methyl-phenylester, 2-amino-5-chlorobenzoic acid 2'-chloro-phenylester, 2-amino-5-nitrobenzoic acid phenylester, 2-amino-5-nitrobenzoic acid - 4'-methyl-phenylester, 2-aminobenzoic acid-4' - acetaminophenylester, 2-aminobenzoic acid-2'-hydroxy-phenylester and 2-amino-3-nitro-5-chlorobenzoic acid-phenylester.

As coupling components there are preferably used pyrazolones of the formula

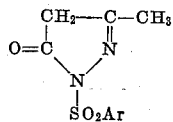

in which Ar represents a benzene radical which may be substituted by substituents not imparting solubility in water, for example, halogen atoms, alkoxy, acylamino, amino or nitro groups. As examples there may be mentioned 1-phenylsulfonyl-3-methyl-pyrazolone-(5), 1 - (4 - methylsulfonyl) - methyl-pyrazolone-(5), 1 - (4 - chlorophenylsulfonyl) - 3 - methyl-pyrazolone - (5), 1-(3 - methoxyphenylsulfonyl) - 3 - methyl-pyrazolone - (5) and 1 - (4-nitrophenylsulfonyl)-3-methyl-pyrazolone-(5).

The aforesaid coupling components are for the greater part known compounds and can be made by methods in themselves known, advantageously by condensing a monophenyl-sulfonyl-hydrazine with aceto acetic acid amide or an aceto acetic ester to form the corresponding hydrazone, which latter can easily be subjected to ring closure by heating it in aqueous suspension to form the pyrazolone. Alternatively, the monophenyl sulfonyl-hydrazine may be condensed directly with diketene and subjected to ring closure.

The aforesaid diazo components can be diazotized by methods in themselves known, for example, by means of a mineral acid, especially hydrochloric acid and sodium nitrite or, for example, by means of a solution of nitrosylsulfuric acid in concentrated sulfuric acid.

The coupling is also carried out by a method in itself known, for example, in a weakly alkaline to acid medium, if desired in the presence of sodium acetate or a like buffer substance that influences the speed of coupling or a catalyst, for example, pyridine or a salt thereof.

After the coupling reaction, the dyestuff formed can easily be separated from the coupling mixture, for example, by filtration, as the dyestuffs of this invention are substantially insoluble in water.

The new monoazodyestuffs of this invention are especially suitable for dyeing or printing hydrophobic fibers, for example, fibers of cellulose acetate rayon, cellulose triacetate and especially polyester fibers, illustratively, polyethylene terephthalate. Brilliant yellow dyeings of greenish tint are produced with the dyestuffs of this invention on the aforesaid fibers which are distinguished by their good general properties of fastness, especially by their high fastness to light and good sublimation. They reserve cotton, a very important consideration in the dyeing or thermofixing of polyester-cotton blend fabrics.

The dyestuff of the present invention is particularly adapted for dyeing by the so-called thermofixation or Pad/Thermofix method, in which the fabric to be dyed is impregnated, advantageously at a temperature not exceeding 60° C., with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 120–220° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example, a direct dyestuff or vat dyestuff or more especially a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used the padded fabric must be treated, after the heat treatment, with an aqueous alkaline solution of a reducing agent of the kind used in vat dyeing.

The dyeings produced on polyester fibers by the process of the invention are advantageously given an after-treatment, for example, by heating them with an aqueous solution of a non-ionic detergent.

The following examples illustrate the invention, the parts and percentages being by weight, unless otherwise stated.

EXAMPLE 1

21.3 parts of 2-aminobenzoic acid phenylester are stirred with 150 parts of water and 31 parts of hydrochloric acid of 30% strength, and diazotized at 0° C. with 50 parts of a 2 N-solution of sodium nitrite. The diazo solution is run into a solution of 23.8 parts of 1-(phenylsulfonyl)-3-methyl-pyrazolone-(5) in 200 parts of water and 15 parts of sodium carbonate.

The dyestuff of the formula

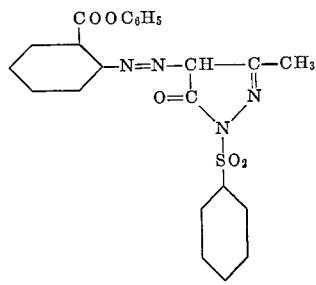

was precipitated by the addition of saturated sodium acetate solution, isolated by suction filtration, washed with water and dried in vacuo. The dyestuff thus obtained is a yellow powder which when applied to polyester fibers in finely dispersed form yields greenish yellow dyeings of good fastness to light and sublimation.

The 1-phenylsulfonyl-3-methyl-pyrazolone-(5) is obtained as follows:

17.2 parts of benzene sulfonic acid hydrazide in 70 parts of alcohol of 50% strength are mixed dropwise at 80° C. with a solution of 11.5 parts of acetoacetic acid amide in 100 parts of water. The mixture is stirred for 2 hours at 80–90° C.

After cooling the mixture, the precipitated 1-phenylsulfonyl-3-methyl-pyrazolone-(5) is obtained by filtering with suction, and is recrystallized from alcohol. There are obtained needles which melt at 164–165° C.

EXAMPLE 2

24.7 parts of 2-amino-5-chlorobenzoic acid phenylester are stirred with 150 parts of water and 31 parts of hydrochloric acid of 30% strength, and diazotized at 0° C. with 50 parts of 2 N-solution of sodium nitrite. The diazo solution is run into a solution of 23.8 parts of 1-(phenylsulfonyl)-3-methyl-pyrazolone-(5) in 200 parts of water and 15 parts of sodium carbonate.

The dyestuff thus obtained is yellow powder which when applied to polyester fibers in finely dispersed form yields greenish yellow dyeings of good fastness to light and sublimation.

EXAMPLES 3–10

When the 2-aminobenzoic acid phenylester of Example 1 is replaced by one of the derivatives listed below in the column headed "Diazo Component" and the 1-phenylsulfonyl-3-methyl-pyrazolone-(5) by a starting material shown in column "Coupling Component" of the following table, there are obtained further dyestuffs that dye polyester fibers greenish yellow tints having very good fastness to light and sublimation.

| No. | Diazo Component | Coupling Component |
|---|---|---|
| 3 | 2-aminobenzoic acid phenylester. | 1-(4'-chlorophenylsulfonyl)-3-methyl-5-pyrazolone. |
| 4 | ----do---- | 1-(3'-methylphenylsulfonyl)-3-methyl-5-pyrazolone. |
| 5 | 2-amino-5-chlorobenzoic acid phenylester. | 1-(4'-methylphenylsulfonyl)-3-methyl-5-pyrazolone. |
| 6 | ----do---- | 1-(4'-acetamino-phenylsulfonyl)-3-methyl-5-pyrazolone. |
| 7 | 2-amino-5-nitrobenzoic acid phenylester. | 1-(phenylsulfonyl)-3-methyl-5-pyrazolone. |
| 8 | 2-amino-3-nitro-5-chlorobenzoic acid phenylester. | Do. |
| 9 | 2-aminobenzoic acid-2'-chloro-phenylester. | Do. |
| 10 | 2-aminobenzoic acid-4'-methylphenylester. | Do. |

EXAMPLE 11

1 part of the dyestuff obtained as described in the first paragraph of Example 1 is pasted with 1.5 parts of sulfite cellulose waste liquor, the paste is diluted with water to 4000 parts, and there are added, per liter 1 part of acetic acid of 40% strength and 1 part of a condensation product from octadecyl alcohol and 20 molecular proportions of ethylene oxide. 100 parts of cleaned polyester fiber material are entered into the dye bath at 50° C., the temperature raised within ½ hour to 115–120° C. and dyeing carried on for one hour at 115–132° C. The polyester fibers are dyed a greenish yellow tint and the dyeing is distinguished by excellent fastness to light and sublimation.

EXAMPLE 12

20 parts of the dyestuff obtained as described in the first paragraph of Example 1 are ground to a fine paste in a ball mill along with 20 parts of dinaphthylmethane disulphonic acid and 70 parts of water. A padding liquor is prepared from 200 parts of a sodium-alginate solution of 2.5% strength, 1 part of acetic acid of 40% strength and 600 parts of water. A union fabric consisting of 67% polyethyleneterephthalate fiber and 33% cotton is padded twice with the above padding liquor to a 50 to 60% weight increase and is then dried at 60° C. The fabric is then subjected to a heat treatment for 1 minute at 200° C. The dyed fabric is then cold rinsed, scoured and finally dried. There is obtained a greenish yellow dyeing having very good fastness properties.

What is claimed is:

1. A monoazo dye of the formula

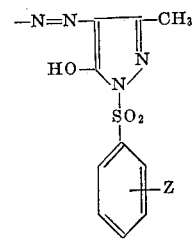

wherein $X_1$ is hydrogen or chlorine, $X_2$ is hydrogen or nitro, Y is hydrogen, chlorine or methyl and Z is hydrogen, acetamino, chlorine or methyl.

2. The dyestuff of the formula

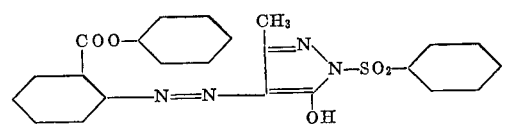

3. The dyestuff of the formula
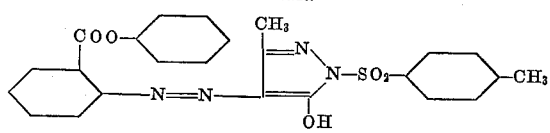
4. The dyestuff of the formula
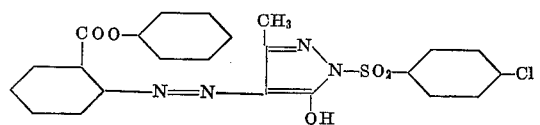
5. The dyestuff of the formula
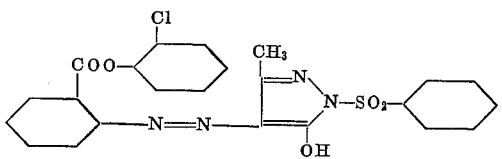
No references cited.
CHARLES B. PARKER, *Primary Examiner.*
D. M. PAPUGA, *Assistant Examiner.*

UNITED STATES PATENT OFFICE
CERTIFICATE OF CORRECTION

Patent No. 3,342,801                  September 19, 1967

Hugo Illy

It is hereby certified that error appears in the above numbered patent requiring correction and that the said Letters Patent should read as corrected below.

Column 4, lines 55 to 65, the formula should appear as shown below instead of as in the patent:

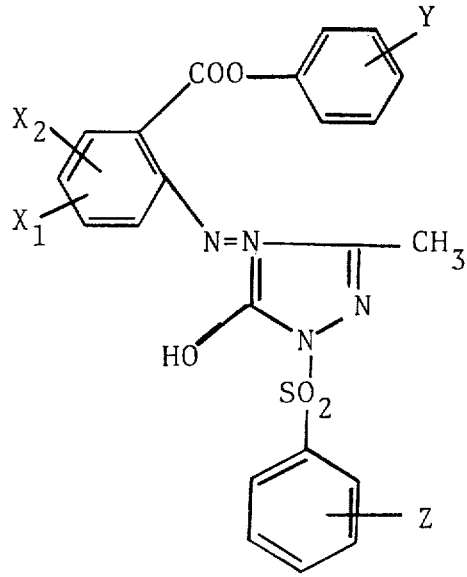

Signed and sealed this 22nd day of October 1968.

(SEAL)
Attest:

EDWARD M. FLETCHER, JR.               EDWARD J. BRENNER
Attesting Officer                     Commissioner of Patents